United States Patent
Howard et al.

(10) Patent No.: US 7,344,161 B2
(45) Date of Patent: Mar. 18, 2008

(54) CONNECTION OF INTERNALLY LINED PIPELINES

(75) Inventors: Brett Patrick Howard, Kinecardineshire (GB); Gordon Tough, Aberdeenshire (GB)

(73) Assignees: Technip France SA (FR); Technip Offshore UK Limited (GB)

(*) Notice: Subject to any disclaimer, the term of this patent is extended or adjusted under 35 U.S.C. 154(b) by 237 days.

(21) Appl. No.: 10/502,694

(22) PCT Filed: Jan. 24, 2003

(86) PCT No.: PCT/GB03/00263

§ 371 (c)(1),
(2), (4) Date: Nov. 19, 2004

(87) PCT Pub. No.: WO03/062691

PCT Pub. Date: Jul. 31, 2003

(65) Prior Publication Data
US 2005/0087980 A1  Apr. 28, 2005

(30) Foreign Application Priority Data
Jan. 26, 2002 (GB) ................. 0201864.6

(51) Int. Cl.
F16L 11/12 (2006.01)

(52) U.S. Cl. .............. 285/48; 285/47; 285/55; 285/370; 29/272

(58) Field of Classification Search ......... 285/48, 285/47, 55, 370, 288.2, 288.5, 288.9; 29/890.14, 29/282, 255, 272
See application file for complete search history.

(56) References Cited

U.S. PATENT DOCUMENTS

| | | | |
|---|---|---|---|
| 3,508,766 A | | 4/1970 | Berg et al. |
| 4,386,629 A | * | 6/1983 | Cook et al. .......... 138/110 |
| 4,913,465 A | * | 4/1990 | Abbema et al. .......... 285/22 |
| 5,104,152 A | | 4/1992 | Galfant |
| 5,346,261 A | * | 9/1994 | Abbema .......... 285/22 |
| 5,348,211 A | | 9/1994 | White et al. |
| 5,547,228 A | * | 8/1996 | Abbema et al. .......... 285/22 |
| 5,685,572 A | * | 11/1997 | Linton et al. .......... 285/21.2 |
| 5,984,370 A | | 11/1999 | Lewis |

FOREIGN PATENT DOCUMENTS

EP       0366 299       5/1990

* cited by examiner

Primary Examiner—David Bochna
(74) Attorney, Agent, or Firm—Ostrolenk, Faber, Gerb & Soffen, LLP

(57) ABSTRACT

An insert for use in connecting two lengths of pipe, each having a plastic liner. The insert consists of an inner tubular member of plastics material for connection at either end to the plastic liners of two pipe lengths, an insulating sleeve surrounding a central portion of the inner tubular member and a ring of heat-resistant material overlying a part of the insulating sleeve to be positioned, when in use, beneath a location at which the pipe length is butt welded, wherein the insulating sleeve includes an insulating material which is at least partially enclosed with a sheath, such that the sheath can be mechanically connected to the interior of one pipe length.

12 Claims, 5 Drawing Sheets

CONNECTION OF INTERNALLY LINED PIPELINES

BACKGROUND OF THE INVENTION

1. Field of the Invention

This invention relates to pipelines which are lined with a plastics material.

Pipelines are constructed by first forming lengths or "stalks" of pipe, and subsequently joining the stalks together. The stalks may be joined in the field for a land-based pipeline. for a subsea pipeline, the stalks may be joined on a lay barge, or may be joined while the pipe is being reeled onto a reel laying vessel.

In many applications a metal, typically a steel, pipeline must be lined with a plastic liner in order to prevent corrosion of the internal surface of the pipe because of the nature of the fluid to be transported and on conditions of use such as pressure and temperature. When connecting stalks of lined pipe together, it is necessary to ensure that the corrosion protection provided by the liner is continuous across the connection.

In onshore use, it is common to connect together stalks of pipe by flanged connections, with the liner material being trapped between the flanges. However, in some land based applications and in many subsea uses, it is not possible to use flanged connections. This is particularly the case when laying undersea pipelines by reel-laying methods.

In these cases it is necessary to connect the pipe stalks by butt welding, and to do so in such a way that the plastic liner is not degraded by the heat of welding. Various means of achieving this have been proposed in the prior art.

It is also known to use plastic liners which are provided on their outer faces with continuous longitudinal grooves. This is done because gas within the transported fluid can permeate through the liner and accumulate at the liner/pipe interface. The grooves allow the gas to travel along the interface to some point where a gas draw-off is provided through the pipe. Prior art methods of joining lined pipe stalks do not permit such grooves or equivalent gas seepage paths to extend across the join.

In the case of reeled pipeline for offshore applications, the assembly of the stalks is made during reeling of the pipe onto the vessel. It is therefore important to reduce the time taken for connecting the stalks, in order to minimise the immobilisation of the vessel.

2. Description of Related Art

U.S. Pat. No. 5,998,691 shows a method of connecting stalks of lined pipe which makes use of pup pieces welded within the ends of the pipe stalks. This method requires continuous corrosion-resistant welds to be made between the pipes and the pup pieces. This method is complicated to implement and takes time. Also, it cannot provide gas drainage grooves extending across the join.

U.S. Pat. No. 5,348,211 also relies on the use of metal inserts welded into the pipe stalk ends, with similar disadvantages.

EP 0,366,299 shows an arrangement using a thermoplastic insert which carries a ceramic ring on top of which welding is performed, insulation being provided between the ceramic ring and the thermoplastic material. However, the arrangement disclosed in this document has the disadvantage that the location of the ceramic ring can vary; this is because the liners and the insert are typically joined under tension, and when abutting the external pipe there can be no assurance that the liner has kept its position. Also, during service the liner can move within the pipe. It is therefore difficult to ensure that the ring is positioned under the pipe welding location in all circumstances. Also, this prior art considerably reduces the size of the internal bore while keeping the thickness of the liner at the connection, and it cannot be implemented with a grooved liner.

SUMMARY OF THE INVENTION

A primary object of the present invention is to provide a method of joining lined pipelines, and an insert for use in said method, which give a simple and quick connection with reduced risk of damage to the liner. Preferred forms of the invention are also capable of providing connection between grooved liners.

The present invention provides an insert for use in connecting two lengths of pipe each of which has a plastics liner, the insert comprising:

- an inner tubular member of a plastics material for connection at either end to the liners of two pipe lengths;
- an insulating sleeve surrounding a central portion of the inner tubular member; and
- a ring of heat-resistant material overlying part of the insulating sleeve to be positioned, in use, beneath a location at which the pipe lengths are butt welded;
- the insulating sleeve comprising an insulating material which is at least partially enclosed by a sheath such that the metal sheath can be mechanically connected to the interior of one of said pipe lengths.

The invention further provides a method of connecting a first pipe containing a first liner to a second pipe containing a second liner, the method comprising the steps of:

- providing an insert as defined above;
- stretching the first liner so as to extend from an end of the first pipe;
- cutting the extended portion of the first liner at a location calculated to cause the cut end of the first liner, upon release of the stretching force, to lie at a given position within the first pipe;
- securing one end of the inner tubular member of the insert to the cut end of the first liner;
- applying a bonding material to the insulating sleeve;
- releasing the stretching force to cause the cut end of the first liner to retract to said given position and the bonding material to bond to the internal surface of the first pipe;
- stretching the second liner so as to extend from an end of the second pipe;
- cutting the extended portion of the second liner at a location calculated to cause the cut end of the second liner, upon release of the stretching force, to lie at a given position within the second pipe;
- securing the other end of the inner tubular member of the insert to the cut end of the second liner;
- releasing the stretching force to cause the cut end of the second liner to retract to said given position within the second pipe while bringing the ends of the first and second pipes into abutment; and
- welding the abutting ends of the first and second pipes together.

Preferred features and advantages of the invention will be apparent from the following description and the claims.

DESCRIPTION OF THE DRAWINGS

An embodiment of the invention will now be described, by way of example only, with reference to the drawings, in which.

DETAILED DESCRIPTION OF THE INVENTION

Figures 1A, 1B:
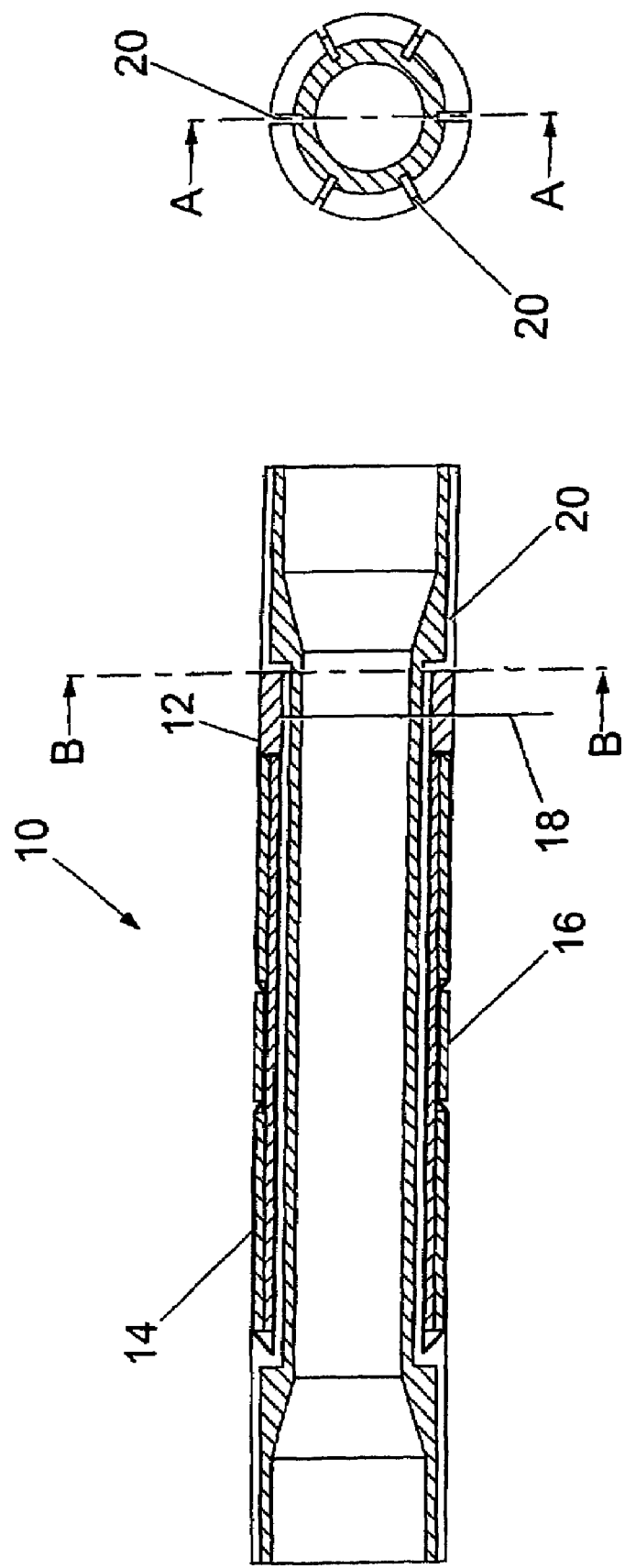
FIG. 1A is a general arrangement, shown in cross-sectional side elevation, of an insert forming one embodiment of the present invention.
FIG. 1B is a cross-sectional end view taken on the line B-B of FIG. 1A.
Figure 2A:
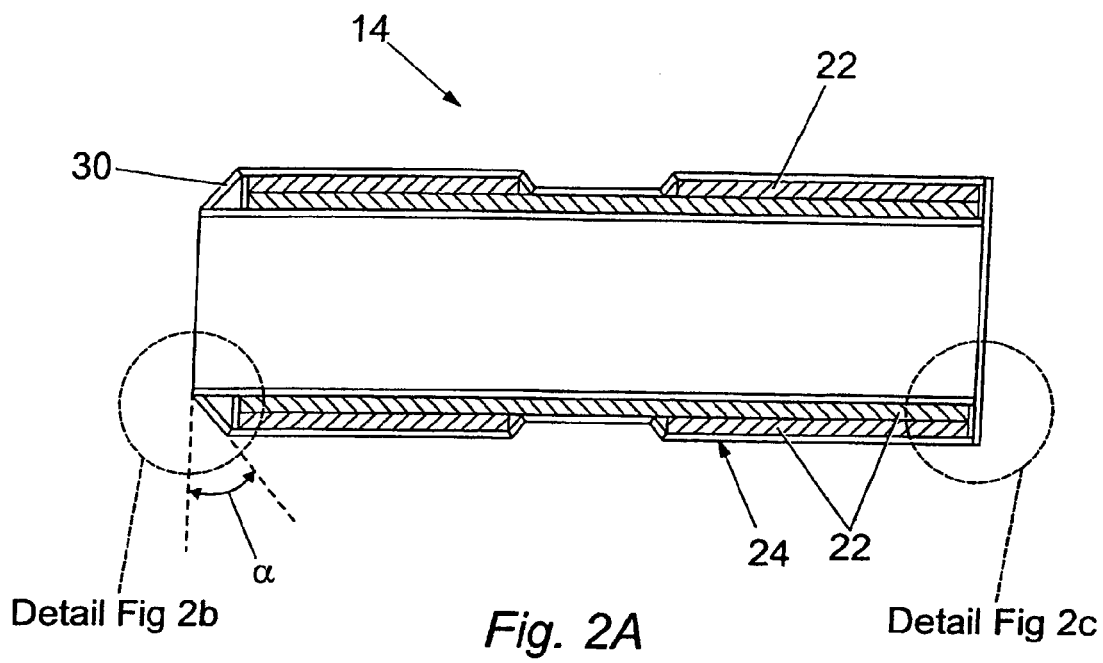
FIG. 2A is a more detailed sectional view of a sleeve forming part of the insert of FIG. 1.
Figure 2B:
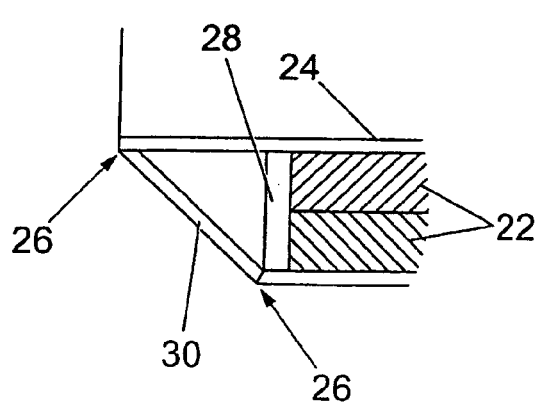
FIGS. 2B and 2C are enlarged views of details of FIG. 2A.
Figure 2C:
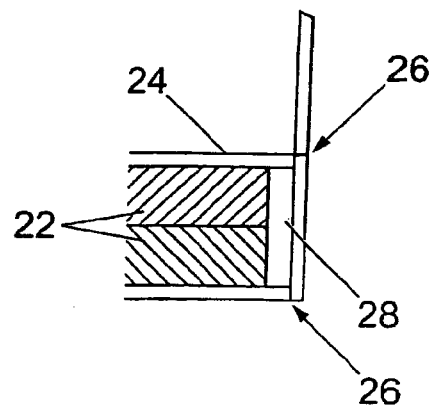
Figure 3B:
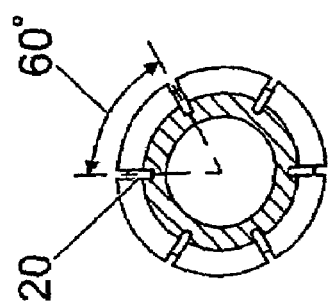
FIGS. 3A and 3B are side and end views, respectively, of a tubular member forming part of the insert of FIG. 1.
Figure 3A:
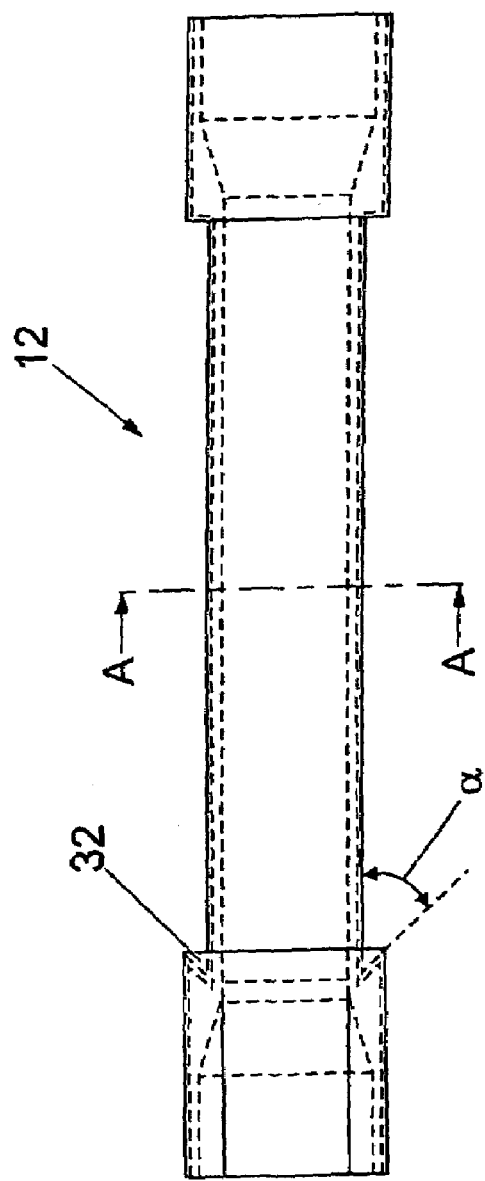

Referring to FIGS. 1 to 3, an insert 10 for use in joining two lengths of pipe comprises an inner tubular member 12 having a central recess in which is received a sleeve 14. The sleeve 14 in turn has a peripheral annular groove in which is received a non-metallic heat resistant element such as a ceramic ring 16. The insert 10 is intended for use in joining pipes having plastic liners, for example of high density polyethylene (HDPE) or fluorocarbon polymer, and the tubular member 12 is formed of a material matching the liners. One suitable material for the tubular member 12 is "Rilsan" polyamide by Atofina. The ceramic ring may, for example, be of Gullco "Katbac" material.

As best seen in FIG. 2, the sleeve 14 comprises a thermal insulation material 22 enclosed within a sheath 24. The insulation material is preferably a compressible material, for example a compressible microporous or insulation foam; one example is a microporous foam having a density of 160-210 kg/m$^3$. The sheath 24 in this embodiment is fabricated from stainless steel 1 mm thick, the parts being brazed at the locations identified at 26. Other metallic materials, for example carbon steel, or non-metallic materials may be used. In some embodiments the sheath is sufficiently thin that in use of the eventual pipeline the working pressure will compress the sheath 24 and insulating material 22, thereby reducing the extent to which the insert 10 reduces the working bore of the pipeline. Such compression is assisted by the provision of end clearances 28 within the sheath 24.

In alternative embodiments of the invention, the sheath 24 can be designed to withstand the working pressure and so it can be fabricated of high strength steel for example. In these embodiments, the internal diameter of the bore of the pipeline will experience a reduction through the connection but the risk of damaging the tubular body 12 of the insert 10 due to the collapse of the sleeve 14 will be reduced or eliminated.

As best seen in FIGS. 2 and 3, one end of the sleeve 14 has the sheath 24 formed at 30 to present an acute angle α which may typically be 45°. The tubular member 12 has a correspondingly angled annular recess 32 in which the end 30 of the sleeve 14 is received.

The sheath 24 allows the sleeve 14 to be bonded to the host pipe during the connection process, preferably by use of an epoxy adhesive. The use of bonding obviates the need for welding the sleeve in place, thus reducing the risk of introducing a fatigue initiation point. This bonding ensures that the heat resistant element is placed at the correct location during external pipe welding operations.

Furthermore, due to the boding of the sheath 24 to one stalk of pipe, the insert is anchored in the host pipeline at each connection location. the acute angle α assists in anchoring the liner during installation and in service by reducing the risk of the liner pulling through the insulating sleeve.

The insert 10 may suitably be assembled by forming the tubular member 12 in two parts which are joined by fusion along the line 18 after the sleeve 14 and ring 16 have been positioned.

In the illustrated embodiment, the tubular member 12 is formed with grooves, in this embodiment six grooves 20, which extend along its length and beneath the sleeve 14. The provision of the grooves 20 allows the insert 10, when used with grooved pipe liners, to provide a gas drain path extending through the connection. In alternative embodiments of the invention the grooves 20 may be omitted, or may be replaced with longitudinal bores extending within the insert body which may be advantageous in reducing strains on the insert material. In the illustrated embodiment, the sheath 24 is useful in protecting the grooves 20 from the insulation material 22. In this case, the sleeve 14 and its sheath 24 can be calculated to withstand the bore working pressure in order to protect the grooves 20.

FIG. 4 shows one example of the method of the invention, in which the insert 10 is used in joining a first pipe stalk 40 having a plastic liner 42 to a second pipe stalk 44 having a plastic liner 46. The method example will be described herein with reference to use with a reel pipelaying ship, but it will be apparent that a similar method may be used in other applications.

Figure 4A:
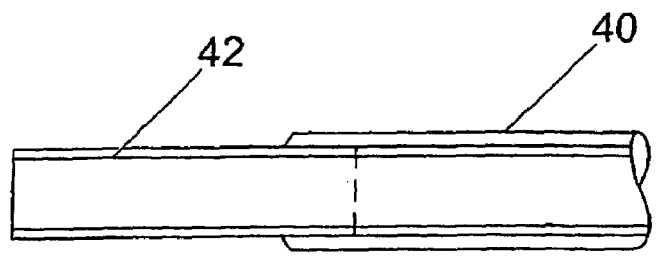
FIGS. 4A to 4G are schematic side views illustrating successive steps in using the insert of FIG. 1 to join two pipe stalks.
Figure 4B:
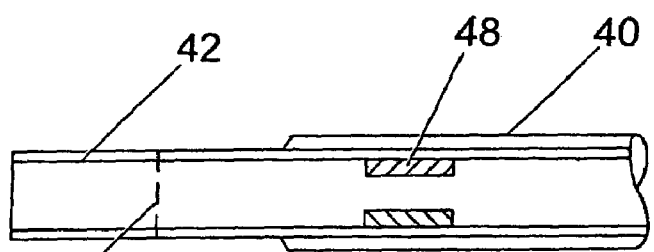
Figure 4C:
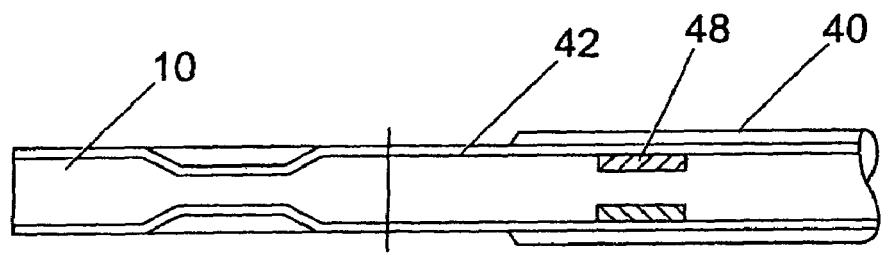

The first stages shown in FIGS. 4A-4C are carried out at the spoolbase where the pipe stalk 40 has been prepared by welding together lengths of pipe and pulling in the liner 42. The liner 42 is pulled through the stalk (FIG. 4A) and then the tension released.

The liner 42 is then extended under tension and released to establish where a cut must be made to produce a cut end at a desired location within the pipe stalk 40. Then, as seen in FIG. 4B, the liner 42 is extended by the required amount and clamped in position by an internal clamp 48 and the liner 42 is cut at 50.

The insert 10 is then positioned abutting the cut liner 42 (FIG. 4C), and the end of the member 12 is fused to the cut end of the liner 42. Epoxy resin is applied to the end of the sleeve 14 facing the pipe stalk 40. The clamp 48 is then released, allowing the liner. 42 to retract drawing the insert 10 partially within the first pipe stalk 40, and the epoxy resin bonds the insert in position within the pipe stalk 40.

The pipe stalk 40 is now reeled onto the reel vessel with the end illustrated extending from the reel.

Figure 4D:
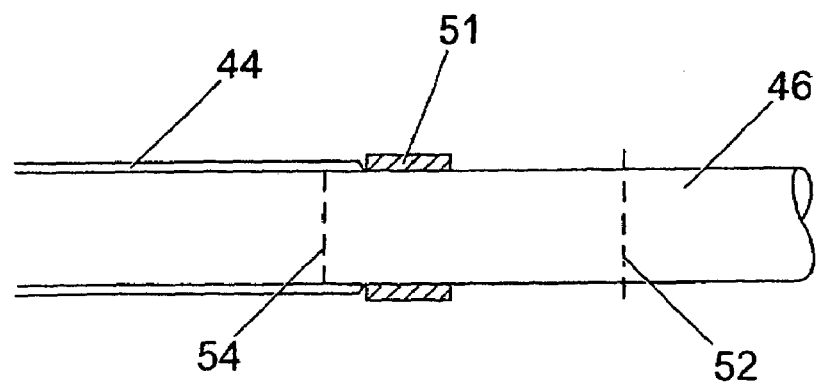
Figure 4E:
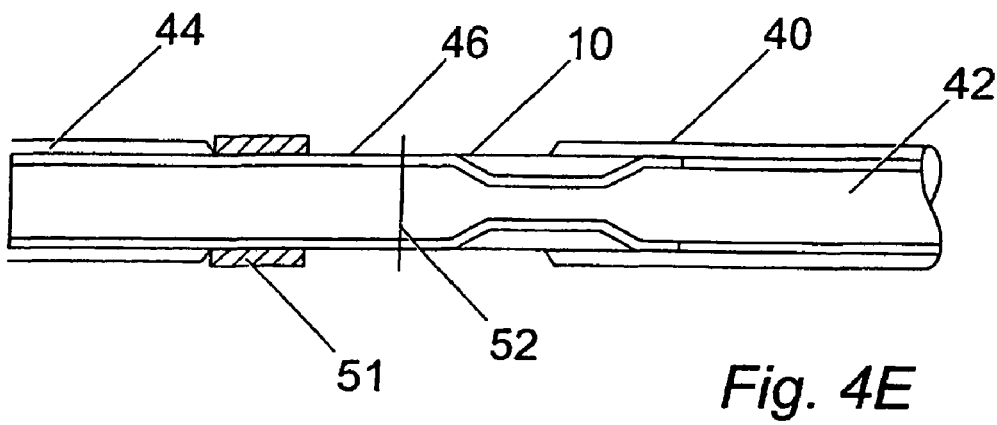
Figure 4F:
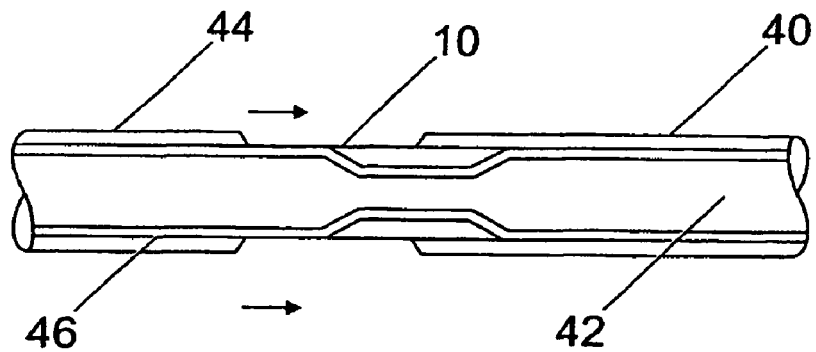
Figure 4G:
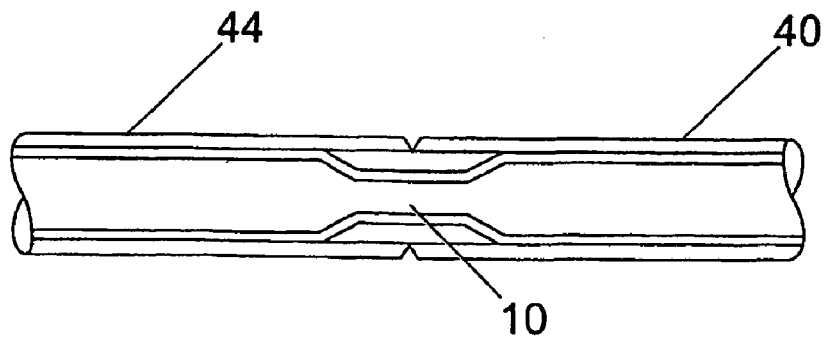

FIG. 4D shows the leading end of the next pipe stalk 44. The liner 46 is extended under tension and released to allow the position for the required cut to be established. Then, the liner 46 is extended and clamped by an external clamp 51, and the liner 46 is cut at 52 such that, on release, the cut end will lie at 54 within the pipe stalk 44.

The next steps will usually be performed in the tie-in shed adjacent the vessel as the stalk 44 arrives. The liner 46 is extended and held by the clamp 51 (FIG. 4E) while the liner 46 is aligned with the insert 10 and the liner 46 is fused to the tubular member 12 at 52. After removing the external fusion bead (the internal bead can remain), the clamp 51 is removed and the stalks 40 and 44 are closed together (FIG. 4F) as the liner retracts.

The ends of the pipe stalks are then aligned for butt welding (FIG. 4G), the weld is made, and the joint is tested.

A preferred feature of the insert 10 is that it is designed to partially collapse or compress under the working pressure of the eventual pipeline, due to the design of the insulating sleeve. The exemplary construction detailed above is suitable for this purpose in a typical subsea pipeline. The encapsulated insulating material collapses, allowing the body of the insert to move radially outward. This feature minimises the reduction of flow area in the pipeline caused by the insert. Where a grooved liner is being used, the metal sheath will prevent the grooves being obstructed by the insulating material. The present invention also makes it possible to provide a join between pipe stalks which has bending characteristics similar to those of the pipe.

Modifications may be made to the foregoing embodiment within the scope of the invention. For example, the sleeve could be only partially, as opposed to entirely, encased in metal but it is desirable to provide a metal portion at least in an area suitable for bonding to the pipe. This could be done by having metal covering to the ends and the outer surface only, or to the ends, the inner surface and end portions of the outer surface. An inner metallic portion is useful in maintaining the grooves open.

It is also possible to incorporate material in the insert which acts as a reflector for radiographic examination, which can be useful in checking the positioning of the insert within the pipe.

The invention claimed is:

1. An insert for use in connecting two lengths of pipe each of which has a plastics liner, the insert comprising:
   an inner tubular member of a plastics material for connection at either end to the liners of two pipe lengths;
   an insulating sleeve surrounding a central portion of the inner tubular member; and
   a ring of heat-resistant material overlying part of the insulating sleeve to be positioned beneath a location at which the pipe lengths are butt welded;
   the insulating sleeve comprising an insulating material having an outer surface portion facing the pipe lengths and an outer surface portion positioned beneath the ring, wherein the outer surface portion positioned beneath the ring is entirely covered by a sheath and wherein the outer surface portion facing the pipe lengths is at least partially covered by the sheath.

2. An insert according to claim 1, in which the insulation material is totally enclosed by the sheath.

3. An insert according to claim 1, in which the sheath is a metal sheath.

4. An insert according to claim 1, in which the length, thickness and materials of the insulating sleeve are chosen such that the temperature at the inner tubular member during welding is below a predefined temperature.

5. An insert according to claim 1, in which the insulating sleeve is adapted to partially collapse under the application of pipeline pressure in order to reduce the intrusion of the insert into a pipeline bore.

6. An insert according to claim 1, in which the insulating sleeve has one axial end formed at an acute angle, the axial end being received in a corresponding annular groove in the inner tubular member.

7. An insert according to claim 1, in which an outer surface of the inner tubular member is formed with a plurality of grooves to provide a drainage path for gases.

8. An insert according to claim 1, in which said insulating material is a foam.

9. A method of connecting a first pipe containing a first liner to a second pipe containing a second liner, the method comprising the steps of:
   providing an insert in accordance with claim 1;
   stretching the first liner so as to extend from an end of the first pipe;
   cutting the extended portion of the first liner at a location calculated to cause a cut end of the first liner, upon release of the stretching force, to lie at a given position within the first pipe;
   securing one end of the inner tubular member of the insert to the cut end of the first liner;
   applying a bonding material to the insulating sleeve;
   releasing the stretching force to cause the cut end of the first liner to retract to the given position and the bonding material to bond to the internal surface of the first pipe;
   stretching the second liner so as to extend from an end of the second pipe;
   cutting the extended portion of the second liner at a location calculated to cause a cut end of the second liner, upon release of the stretching force, to lie at a given position within the second pipe;
   securing the other end of the inner tubular member of the insert to the cut end of the second liner;
   releasing the stretching force to cause the cut end of the second liner to retract to said given position within the second pipe while brining the ends of the first and second pipes into abutment; and
   welding abutting ends of the first and second pipes together.

10. A method according to claim 9, in which the bonding material is epoxy resin.

11. A method according to claim 10, in which the epoxy resin is applied to the sheath of the insert.

12. A method according to claim 9, in which, before the first liner is stretched and cut, the liner is first stretched and released to allow estimation of the cutting position required to bond the insert in a position such that the butt weld overlies the ring.

* * * * *